INVENTOR:
Meyer Frenkel

INVENTOR:
Meyer Frenkel

FIG. 17

United States Patent Office 2,806,676
Patented Sept. 17, 1957

2,806,676

HEAT TRANSFER APPARATUS

Meyer Frenkel, London, England

Application June 13, 1951, Serial No. 231,288

7 Claims. (Cl. 257—245)

This invention relates to heat exchangers.

More particularly the invention relates to heat exchange apparatus employing at least one flowing fluid (gaseous or liquid) from which heat is abstracted or to which heat is imparted.

The invention is applicable for example to all types of heat exchangers used in the chemical industry, to heat exchangers used for heating or refrigeration, to evaporators, condensers, radiators for internal combustion engines, oil coolers and other heaters or coolers for gaseous or liquid fluids.

The idea underlying the present invention is based on the following phenomena:

The heat exchange of a fluid flowing in a duct (e. g. in a tube) with the walls of the duct (the heat transferring walls), mainly takes place in the layers of the stream which are adjacent the heat transferring wall, while the layers of the fluid remote from the heat transferring wall, i. e. the inner layers of the stream, partake in the heat exchange only to a small degree.

As can be proved, even with large velocities of the fluid producing turbulent flow in the duct, the heat exchange in the duct itself due to the turbulence only will be such that although a certain mean temperature of the fluid will be achieved, there will still be large temperature differences between the layers of the fluid adjacent the heat transferring wall and those remote therefrom.

Moreover, in order to achieve transfer of a certain quantity of heat, large surface areas of heat transferring wall are required, for reasons concerned with the distribution of the intensity of turbulence over the cross-section of a flow, with the distribution of velocity over the flow-cross-section and with the fact that of the three different kinds of intermixing between hot and cold particles during turbulence which can be distinguished, only one kind of intermixing (that between hot and cold particles) is useful for the heat transfer. These factors yield the cumulative result in a duct that the slow layers adjacent the heat transferring wall, which represent only a small proportion of the throughput, develop a temperature change much in excess of the average for the flow, and this rapidly reduces the temperature difference through the heat transferring wall between the layers immediately adjacent thereto which is determining for the actual rate of heat transfer (as distinct from the difference between mean temperatures). This is treated at greater length in the U. S. Patent No. 2,597,091, of which the present specification is a continuation-in-part, and where it is demonstrated that, briefly, for ducts with turbulent flow only, transfer of a certain quantity of heat to or from a fluid, in order to bring it to a required mean temperature, is only achieved at the expense of disproportionately large surface areas of heat transferring wall and disproportionately large pressure losses due to turbulence, while the temperature distribution of the fluid leaving a tube is still very uneven.

One object of the present invention is to provide apparatus in a heat exchanger duct of any cross-sectional shape which enables a required temperature change to be achieved substantially equally for all layers of the flowing fluid while keeping the temperature difference between layers of fluid adjacent the wall at any position along the duct and the wall itself high substantially along the length of a duct, so that a high rate of heat transfer per unit area of heat transferring wall per unit volume of fluid flowing per unit period is maintained substantially along the length of a duct.

Another object of the invention is to achieve transfer of a certain quantity of heat to or from a fluid in such a manner that the temperature of all layers on leaving the duct is substantially equal to the mean temperature required with relatively small areas of heat transferring walls.

A further object of this invention is to achieve the efficient heat interchange without unnecessary pressure losses in turbulence.

It is a further object of the invention to provide constructions of plate-type heat exchangers which, for a given pressure-difference between the media in heat exchange, have the smallest thickness of heat transferring wall, and thus the greatest rate of heat-transfer due to this reason, e. g. constructions of plate type heat exchangers, particularly of the built-up type, in which the thickness of heat transferring wall approaches the small values used in small diameter tubes, e. g. in shell-and-tube type heat exchangers built for such pressure-differences.

It is a further object of the invention to provide heavy-duty heat exchangers free from the disadvantages of shell-and-tube type heat exchangers of providing totally different flow conditions for the medium inside the tubes, and the other medium flowing about the tubes in the shell, and which can be assembled from sections on site, either permanently, or in such a way as to allow later disassembling for cleaning, replacement of defective parts, and like purposes, and which also allows heat exchangers of different capacities to be constructed from different numbers of the same units.

Other objects and advantages of the invention will become apparent as the description thereof proceeds.

In order to achieve the foregoing objects, the present invention provides for means for ensuring that each layer of a cross-section of a medium flowing in a duct, however small the thickness of layer required for effective heat exchange may be in any set of circumstances, is brought into contact with a section of the heat transferring wall only for such time as is required for it to take part efficiently in the heat exchange, each layer taking part in the heat exchange evenly throughout its surface. Thereby consecutive sections of the heat transferring wall along the direction of flow of the fluid come into contact with layers which respectively have not yet been in contact with the heat transferring wall (e. g. for a case of cooling the starting temperature of a fresh layer is higher than the leaving temperature of the previously layer), thus substantially keeping up the temperautre of the heat transferring wall on the side of the fluid in question along the length of the wall. This serves to maintain the temperature difference between the fluids at either side of the heat transferring wall, thus much increasing the average rate of heat transfer per unit area of heat transferring wall per unit volume of fluid flowing, while all layers emerge from the duct with substantially the required temperatures.

In effecting such layer transposal, it is essential that a layer flowing originally along the heat transferring wall adjacent thereto should be diverted therefrom along the entire width of the heat transferring wall (along the entire periphery of a flow cross-section) without preferred positions. This is in order not to cause stoppages or reductions in the velocity of the layer at any position, because in many liquids these extend back along the wall, putting certain areas of the wall substantially out of action for heat transfer.

Moreover the bringing to the heat transferring wall of a duct of fresh layers from the interior of the stream at different positions along the duct, further contributes to the maintenance of the temperature difference in the following manner:

Each layer brought to the heat transferring wall from the interior of the stream has an initial velocity which is many times greater than that of the layer which has been removed from the wall, and this velocity only becomes reduced to its small value for the steady state in a "stabilizing distance," which for laminar flow is from 60 to 80 times the tube diameter, and for turbulent flow is between 20 and 30 times the tube diameter.

In this "stabilizing distance," where due to the greater velocity of the layers, near the heat transferring wall greater masses per unit period flow in the intermediate proximity of this wall, the quantity of heat per unit period which, due to the existing temperature difference, can pass through a unit area of heat transferring wall is provided by this greater mass of fluid flowing per unit period immediately adjacent the heat transferring wall, so that the temperature of this mass of fluid flowing changes less quickly than would the temperature of a smaller mass flowing immediately adjacent the wall, due to a smaller velocity of layers.

The invention will now be described by way of example and in some detail, reference being had to the accompanying drawings, in which.

The embodiments of this invention to be described and illustrated by way of examples in the following with reference to Figs. 1 to 17, may be termed "layer transposing devices" and effect, at a position along a heat exchanger passages or channels where the layers of the flow adjacent the heat transferring wall are calculated to have taken their part in the heat exchange required for maximum efficiency, that said layers are transposed to the centre of the flow in a continuation of the duct, while the former layers of the flow remote from said wall are now transposed adjacent to said heat transferring walls.

The embodiment to be described with reference to Fig. 1 effects, that at a position along the heat exchanger duct (tube) where the outer layers of the flow are calculated to have taken their required part in the heat exchange, said outer layers are separated from the inner layers of the flow by the insertion of a tube-stump of smaller cross-sectional area, but substantially similar cross-sectional shape as the duct, thus forming branch passages, and where by separation and renewed interpenetration of the branch passages carrying respectively the outer layers of the flow and inner layers of the flow in the former passage, new ducts are formed in which the former outer layers of the flow are the innermost layers of the flow, while former inner layers of the stream flow adjacent the heat transferring walls, taking maximum part in the heat exchange.

By repeated application of such layer transposing appliances, a desired number of layers of a flow-cross-section (however small their thickness for effective heat exchange may be in any set of circumstances) can be brought one after another into contact with successive sections of the heat transferring wall in the direction of flow.

Figure 1:
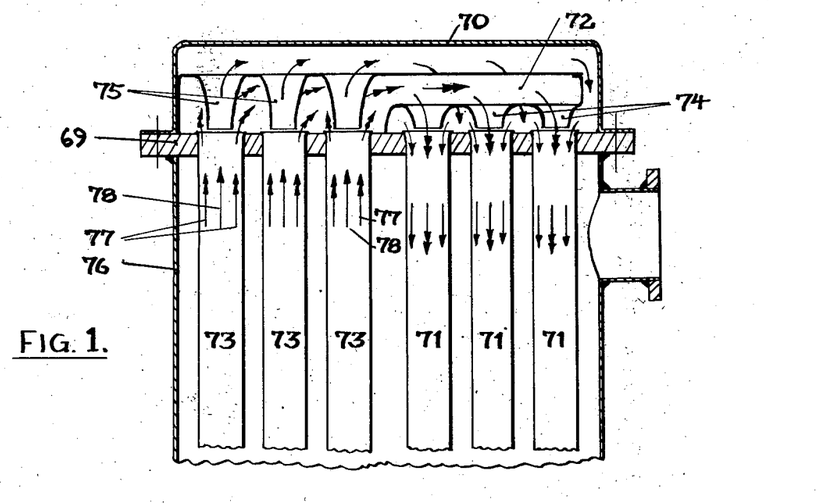
Fig. 1 shows in section an embodiment of layer transposing device applied to the return header tank (return-bend) of a two-pass shell-and-tube heat exchanger.

Fig. 1 shows the layer transposing device of the present invention in application to tubes of circular cross-section in a shell-and-tube-type heat exchanger.

The appliance is installed in place of the ordinary header tank outside tube-plate 69, and comprises a return bend 70, from which depends tube bundle 71. Said return bend 70 houses separating wall forming a second return bend 72, from which depends tube bundle 73. Also depending externally from inner return bend 72 and communicating therewith are bundles of tube stumps 74, entering into the tubes 71. Carried by the wall, but not communicating with the second return bend 72 are bundles of tube stumps 75 which project internally of the second return bend 72 and into the tubes 73, and communicate directly with return bend 70. The tube bundles are surrounded by shell 76, in which flows the other fluid taking part in the heat exchange.

In this example a part of tube plate 69, the separating wall forming the second, internal return bend and the tube-stumps 74 form a first guide wall which extends from the entire peripheries of the heat transferring walls of tubes 73, and away from the inlets of said tubes, and which first guide wall ends remote from the heat transferring walls of return tubes 71.

The tube-stumps 75 communicating with return bend 70 which connects to another part of the tube plate for tubes 71, form a second guide wall which begins with an edge facing towards the inlets of tubes 73 at positions remote from the heat transferring walls thereof, said second guide-wall extending from said edges away from said inlets of tubes 73 and towards the heat transferring walls of tubes 71.

The appliance operates as follows:

In the tubes 73 the outer layers of the flow, which have taken their required part in the heat exchange, and which are denoted by double-headed arrows 77, are separated from the inner layers of the flow by suitably dimensioned tube stumps 75, leading the inner layers denoted by arrows 78 of the whole tube bundle into first return bend 70, while all the outer layers of the bundle flow into second, internal return bend 72. From this return bend 72 the formed outer layers are introduced into the interior of the streams in the return tubes 71 by means of the tube stumps 74, while the former inner layers of the stream, denoted by double-headed arrows 77, flow round return bend 72 from all sides and enter the tubes of bundle 71 as outer layers of the flow, taking their part in the heat exchange.

Thus, by means of this layer transposing appliance of simple construction, which can be applied to shell-and-tube heat exchangers of otherwise usual arrangement in place of the present return header tanks, or which may be simply an accessory to be inserted into the header tank of a shell-and-tube-type heat exchanger, the mean temperature difference through the heat transferring walls between the two fluids taking part in the heat exchange, taken over the combined lengths of tubes 73 and 71, is kept much higher than it would be with an ordinary header tank returning the flow, so that the rate of heat transfer per unit area of heat transferring wall per unit volume of fluid flowing will be considerably increased, leading to a considerable saving in area of heat transferring wall for a required performance while producing substantially even temperature distribution in the emerging flow. The keeping up of the temperature difference is further contributed to by the fact that in the return tubes 71 the new outer layers of the flow enter the tube with a much greater velocity than they will have when a steady velocity distribution in the tube is reached, as the inner layers of the flow in the former tubes move much more quickly, and thus, during the "stabilizing distance" of the flow, the heat transferred per unit area of heat transferring wall per unit period produces a smaller temperature drop in the faster-moving layer on the heat transferring wall than it would do from a slowly moving one when the steady velocity distribution has been reached.

This same factor, in addition to the keeping high of the mean wall temperature, for a case of cooling, will also contribute to keeping small the mean thickness of stagnant boundary layer in liquid flow, which acts as heat insulation.

The next embodiment of this invention to be described is applicable to heat exchanger ducts of any desired cross-sectional shape, and more particularly to tubes.

The device will effect that each layer of a cross-section of flow of fluid (however small its required thickness for effective heat exchange may be) is brought one after another into contact with consecutive sections of the heat transferring wall, only for such time as is required for it to take its required part in the heat exchange, so that thereby consecutive sections of the main heat transferring wall along the direction of flow of the fluid come into heat exchange with layers of the fluid which respectively have not yet been in contact with the heat transferring wall and thus start their heat exchange with a temperature nearer the original temperature of the fluid than the temperature of the layer which has left the wall, thus substantially keeping up the temperature difference through the heat transferring wall all along the length of the duct. Hence the mean rate of heat transfer per unit area of heat transferring wall per unit volume of fluid flowing, will be considerably increased.

More particularly, one embodiment provides for the removal of the layers of fluid near the heat transferring wall, in which turbulence mainly takes place and which mainly take part in the heat exchange, from the heat transferring wall by means of an layer transposing device at a position along the tube where they have reached their required temperature, and that these layers are removed into the interior of the flow.

Substantially simultaneously, the next inner layers of the flow, which have hardly taken part in the heat exchange, are brought to the heat transferring wall. Thus a layer of the fluid which has hardly taken part in the heat exchange is brought to the heat transferring wall, starting its heat exchange with practically the original temperature of the fluid, so that the temperature difference through the wall is increased, and this layer flows along the heat transferring wall instead of the former outer layer which would only have hindered the heat exchange due to its action as heat insulating layer and due to its small temperature difference to the other fluid through the heat transferring wall.

The layer now flowing adjacent the heat transferring wall will be left to flow adjacent the heat transferring wall until it has had its required temperature change, and will then, if still necessary, be replaced on the continuation of the heat transferring wall by a layer from inside the flow which has not yet flowed adjacent the heat transferring wall and so on, until the whole stream has acquired the required temperature. In this way, consecutive sections of the main heat transferring wall along the flow direction come into heat exchange with layers of the fluid which will not yet have been in contact with the heat transferring wall, and start their heat exchange with a temperature nearer the original temperature of the fluid that the temperature of the former layer on leaving the wall, so that the temperature difference through the heat transferring wall is kept high all along the length of the passage. Hence the mean rate of heat transfer per unit area of heat transferring wall per unit volume of fluid flowing will be considerably increased, and the layers will emerge with substantially equal temperatures.

Figure 2:
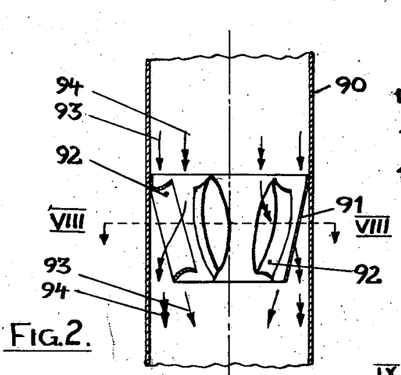
Figs. 2 and 3 show in sectional side-elevation and sectional plan a layer transposing device for use in tubular heat exchanger ducts, e. g. in the tubes of shell-and-tube heat exchanger.
Figure 3:
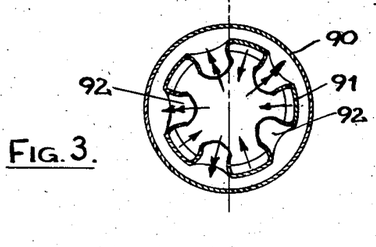

In Figs. 2 and 3, the layer transposing device in a tube 90 having an inlet and an outlet comprises a convergent deflecting vane 91, which extends from the heat transferring wall of said tube at the entire periphery of a flow cross-section in the direction away from said inlet, and ends remote from said heat transferring wall. This convergent vane forms the first guide wall. The device further comprises nozzles 92 mounted on the vane 91 and penetrating therethrough. These nozzles form second guide surfaces, which respectively begin with an edge substantially facing towards said inlet at a position remote from said heat transferring wall and extend from said edge away from said inlet and towards said heat transferring wall.

The appliance operates as follows:

The convergent deflecting vane 91 leads the outer layers of the flow, denoted by single-headed arrows 93, gradually away from the heat transferring wall 90 from all round the periphery of the tube towards the centre of the stream. The outer layer has, in being led from the wall, to flow around the nozzle 92, while the next inner layer, denoted by double-headed arrows 94, flowing at the entries of the nozzles, has to flow through these to the heat transferring wall due to the depression caused under the guide vane 91 due to the outer layer having been removed from the heat transferring wall, and due to the piston action towards the entrances of the nozzles 92 of diametrically oppositely situated sections of the former outer layer. This piston action is due to the radially inwardly directed velocity components of such sections of former outer layer, and due to these sections experiencing a radial thickening of their flow cross-sections, as may be visualized from the plan section of Fig. 3, whereby the kinetic energy of the inner layer in its flow through said nozzles is increased at the expense of the pressure energy of the whole flow of the fluid, by an amount equal to the product of the mean pressure, the cross-sectional area of the nozzle and the mean velocity of flow therethrough, said energy being later substantially returned into pressure energy.

Apart from this, a section of the former outer layer which is diverted inwards in the space between two nozzles, cannot overflow the rim of the two nozzles adjacent to it and enter into these, because its radially inwardly directed velocity component would have to be turned through an angle of 180° to do this, which only impact against the inner layer could achieve. This, however, is impossible, as the total change of direction of a section of the inner layer from its axial motion, required to make this enter into a nozzle diametrically opposite the section of the outer layer in question, is less than 90°, as seen from the double headed arrow in the elevation Fig. 2.

A further positive feature is that the vortices formed adjacent the heat transferring wall for fluid leaving the device due to the inner layer coming to this wall, prevent the formation of stagnant heat insulating layers of fluid on this wall.

An embodiment of the invention like that illustrated in Fig. 1 has no similarity, (in fact, nothing in common) with constructions of heat exchangers known in the art. As regards the embodiment illustrated in Figs. 2 and 3, this differs fundamentally from constructions attempting to improve the heat exchange for fluid flow in tubes, as follows:

In such constructions, in contrast to the constructions illustrated in Figs. 2 and 3, in which the layer originally flowing adjacent the heat transferring wall is diverted therefrom at the entire periphery of a flow cross-section, the layer originally flowing adjacent the heat transferring wall is only diverted therefrom at about half the periphery of a flow cross-section whereas this layer experiences a stoppage at the other half of said periphery. This effects a stoppage of the flow of these parts of the layer adjacent the heat transferring wall far back along the passage against the flow direction, which strongly reduces the heat transfer through the affected areas of wall (for liquids stagnant layers are formed), putting these areas substantially out of action as heat transferring wall, and thereby reducing the mean rate of heat transfer for the heat exchanger as a whole.

Further, such constructions form closed channels for parts of the formerly outer layer of the fluid, in contrast to the embodiment shown in Figs. 2 and 3, where the effect of such restricted channels is to make parts of the formerly outer layer overflow the walls of this channel, and, instead of being brought to positions remote from the heat transferring wall, to bring these back into positions adjacent the heat transferring wall, while parts of layer formerly in the interior of the flow remain there, so that thus an effect opposite to that aimed at is achieved, and the heat exchange is worsened. Apart from that, such constructions cause large friction losses in the flow of the fluid.

Figure 4:
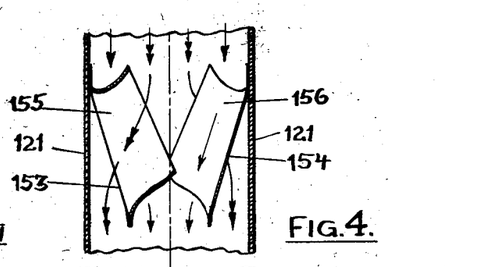
Figs. 4 and 5 show in sectional side elevation and in plan a layer transposing device for application in heat exchanger ducts of elongated cross-sectional shape, as e. g. such ducts formed between parallel plates.
Figure 5:
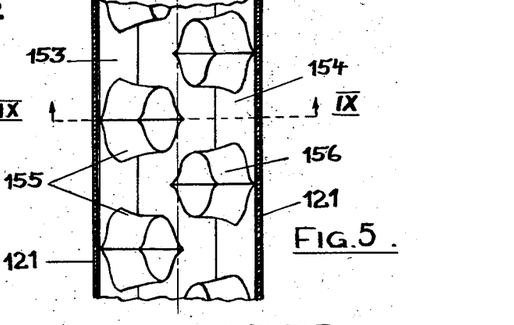

Figs. 4 and 5 show, in sectional elevation and plan, the layer transposing device described with reference to Figs. 2 and 3 in application to a duct of elongated cross-sectional shape, such as may be formed between two opposite plane plates 121. The layer transposer comprises oppositely arranged guide-vanes 153 and 154, which guide-vanes extend from the heat transferring wall at substantially the entire width of the heat exchanger duct and in the direction away from the inlet of the said duct, and end remote from the heat transferring walls of said duct. The layer transposer further comprises nozzles 155 and 156 spaced respectively along the guide-vanes 153 and 154 in such a way that each of the nozzles extends towards a part of the opposite first guide-vane, on which there is no nozzle. These nozzles each begin with an edge facing towards the inlet of the duct at a position remote from the heat transferring wall thereof, and extend from their respective edges towards said heat transferring walls.

The operation of this layer transposing device is as described already with reference to Figs. 2 and 3.

It will be understood, however, that even one guide-vane with its nozzles mounted upon or pressed out from it will, in a duct or even in a channel which is open on one side, effect layer transposal with respect to the heat transferring wall the guide-vane extends from.

Figure 17:
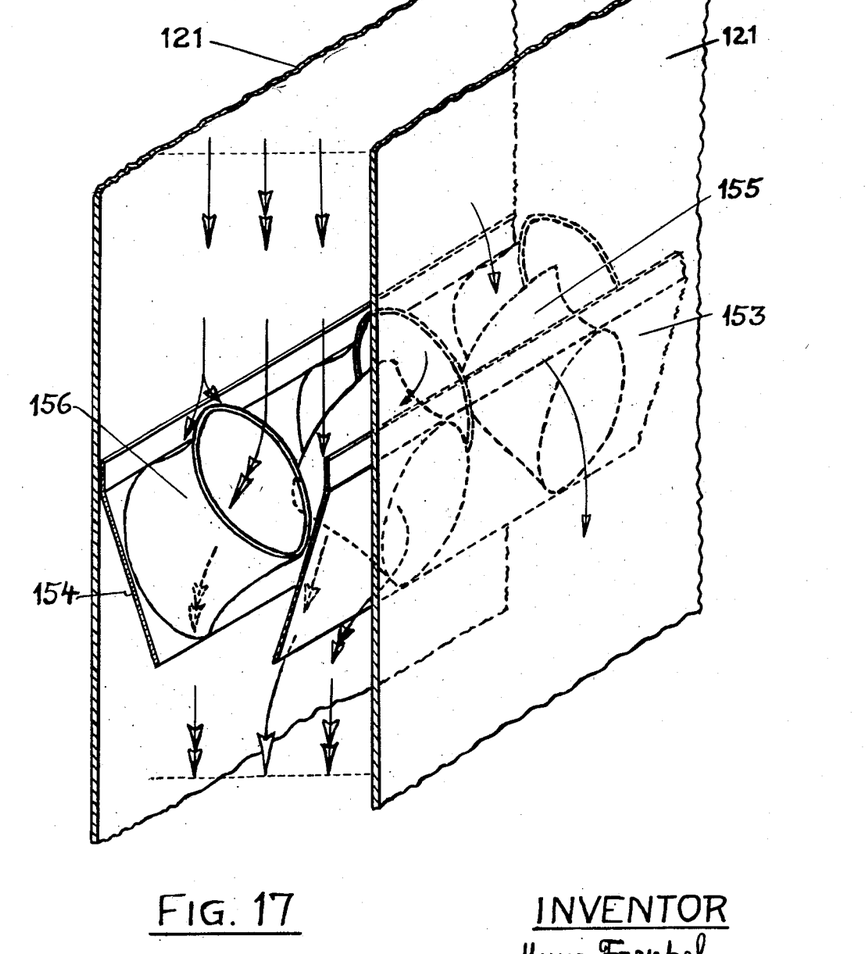
Fig. 17 is a perspective view of the layer transposer for passages of elongated cross-sectional shape, as shown in Figs. 4 and 5.

Fig. 17 shows a perspective view of the layer transposing device as described with reference to Figs. 2 to 5, like numerals denoting like parts.

Figure 6:
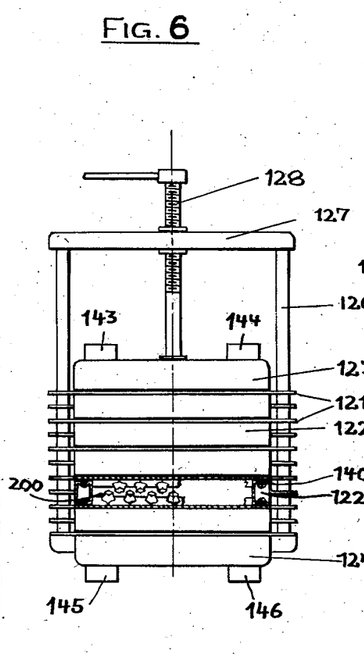
Fig. 6 shows in plan, partly in section, an assembled built-up plate heat exchanger embodying flow layer transposers.
Figure 7:
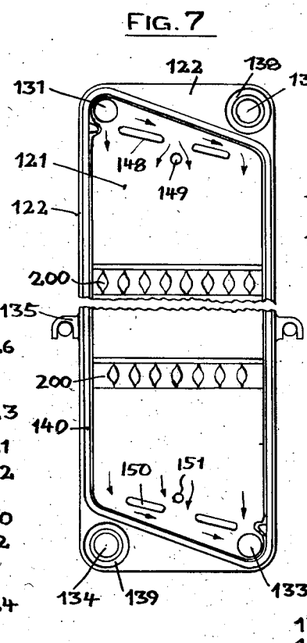
Fig. 7 shows in side-elevation a spacing frame for the heat exchanger of Fig. 6, indicating the arrangement of the layer transposers along the flow-path.

Figs. 6 and 7 represent a heat exchanger in which flat plates 121 as heat transferring walls alternate with spacing members 122 to form the heat exchanger passages for the fluids in an assembly held between the end-pieces 123 and 124 in a frame comprising side-bars 126 and cross-bar 127, with screw-provision 128 for pressing the components together in the assembled state, and allowing them to be taken apart, giving access to each plate and each spacing member for easy cleaning and the like.

The heat exchanger plates 21 are each flat and provided with 4 holes 131, 132, 133, and 134, serving as ports for the heat exchange fluids as hereafter explained, and which, though here shown as circles, maybe of any required shape, and positions on the plate. The plates also have lugs 135 fitting onto frame-bars 126. The spacing frames are of the shape shown in Fig. 9 and comprise on each side three complete enclosures of packing material, such as rubber strip 136 fitted into suitable grooves 137, which strip projects from the surface of the frame when this is not in assembly, and becomes deformed against the flat faces of the plates when the heat-exchanger is assembled under pressure—to form fluid-tight joints with these plates, where metallic contact between plates and frame may or may not take place.

The large enclosure 140 of packing material, which passes around the ports 131 and 133 and the remaining rim of the frame with the exception of ports 132 and 134 forms, in the assembled heat exchanger, a heat exchanger passage for one of the fluids, which flows in and out through ports 131 or 133, while the two rings 138 and 139 of packing material round the ports 132 and 134 only form ducts across this space between the two plates for the other fluid taking part in the heat exchange to pass across this space without substantial heat exchange.

With the spacing frames arranged in inverted order for alternate spaces between heat exchanger plates, so that the enclosure 140 encloses ports 131 and 133 for the one fluid in one such space, as described, and the ports 132 and 134 for the other fluid in the adjacent spaces, with the small enclosures 139 and 138 enclosing the other two ports respectively, a series of interleaved heat exchanger ducts for the two fluids in heat exchange is formed, through which these may pass in counter-flow or in parallel flow relative to one another, depending on which one of the pairs of ports 131—133 and 132—134 is used as entry and exit port respectively. This is determined by the entry and exit pipe connections for the two fluids to the pipe stems 145 and 146 in end-piece 124 and pipe stems 143 and 144 in end-piece 123 respectively. It will be seen that apart from the end-pieces 123 and 124 the body of the heat exchanger comprises only two different component parts, viz. the perfectly flat plates and the spacing frames 122, which carry all devices for promoting heat transfer, such as the layer transposing devices 200 here shown, which are described with reference to the detail on Figs. 8 and 9.

This shows the oppositely arranged guide-vanes 153 and 154 in each duct, said guide-vanes extending respectively the entire width of the heat exchanger passage and diverting the fluid layer flowing adjacent the heat transferring wall smoothly therefrom to the interior of the flow. The layer transposing device further comprises nozzles 155 and 156 spaced along vanes 153 and 154 respectively in such a way that each of them faces a clear part of the vane. These nozzles have edges facing the inlet of the duct and are of stream-line shape with respect to the flow of the outer layer which is being diverted from the heat transferring wall, so that this passes smoothly round the nozzles, and the openings of the nozzles are so arranged that due to the pressure-increase in the centre of the flow arising from the former outer layers being diverted to the centre, and due to the depression under the vanes 153 and 154, the inner layers of the flow move through these nozzles, each section of outer layer between the nozzles exerting a kind of "piston action" on the adjacent part of inner layer to push this through the oppositely situated entry of a nozzle. The former inner layers spread under vanes 153 and 154 on the heat transferring wall and the former outer layers continue in the centre of the flow, so that layer transposal is thus carried out, as shown by the single and double headed arrows in the Figs. 8 and 9, for the adjacent heat exchanger ducts.

Figure 14:
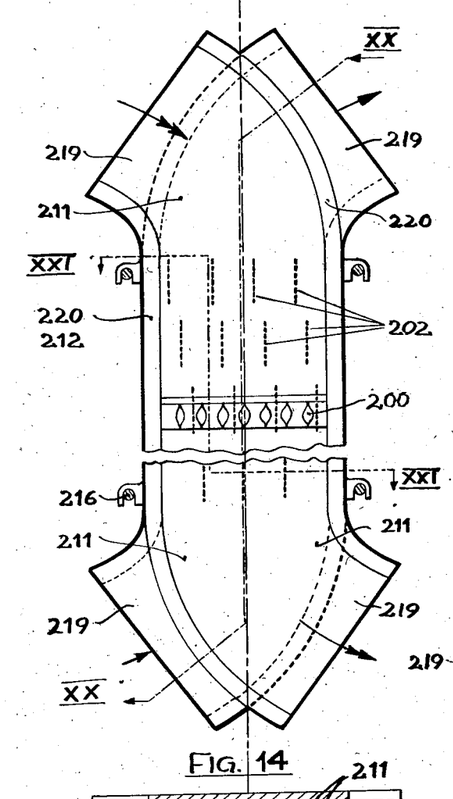
Figs. 14, 15 and 16 show in sectional front elevation, sectional side-elevation and sectional plan a built-up plate heat exchanger embodying layer transposers and adapted for through-flow of two media with minimum losses, this example being applicable particularly as gas-to-gas heat exchanger.

The spacing frames 122 are shown to consist of sheet metal suitably shaped, with grooves 137 for the packing strip 136, which is, say, rubber thread, or similar suitable material which projects from the groove when the heat exchanger is disassembled, but is pressed against the face of the plate 121 to make a fluid tight joint when the heat exchanger is assembled. It must be stated that although Fig. 14 shows metallic contact between the spacing frame and the plate, this need not take place if a sufficiently tight seal and sufficiently accurate spacing is achieved by the contact of the packing material only.

Further, the fluid seal may be supplemented by other methods of sealing, e. g. a labyrinth packing, where this is warranted.

The layer transposing devices may be permanently fixed, or removably mounted on the spacing frame, but it will be seen that they are very easily accessible for cleaning, in either case with the heat exchanger in the disassembled state. The packing may also be fixed on a plate, as also the spacing provision, which would make spacing frames superfluous.

Guide provisions 148, 149, 150 and 151 are arranged at entry and exit of each heat exchanger passage, to effect even distribution of flow over the cross-section, where this may be fixed in the spacing frame, or permanently or removably fixed on the plates.

Figures 10, 11, 13:
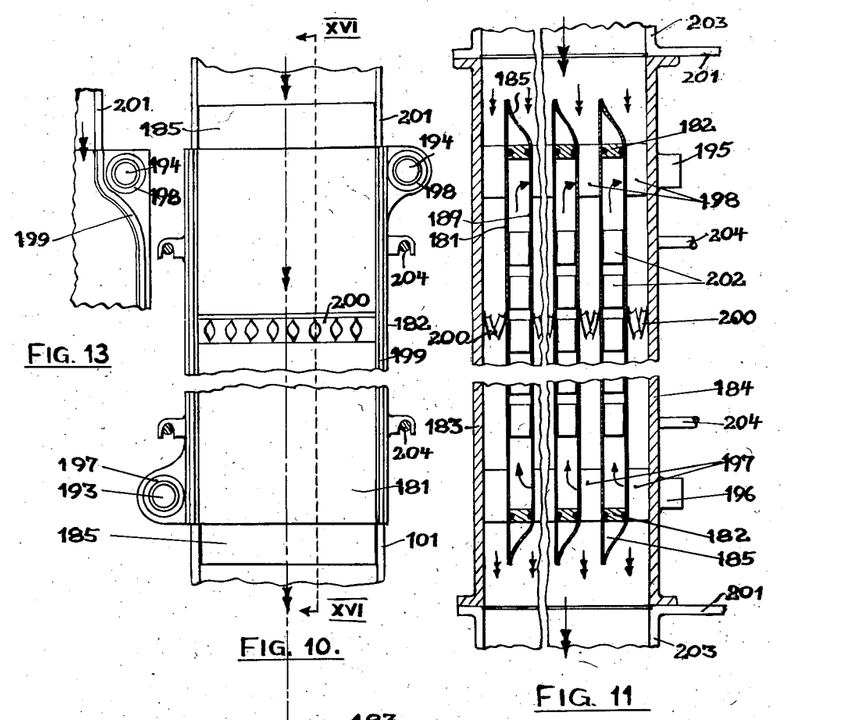
Figs. 10, 11 and 12 show in sectional front elevation, sectional side-elevation and plan a built-up plate heat exchanger embodying layer transposers, and adapted for through-flow of one medium with minimum losses; the example being applicable as intercooler in the compression of a gas or vapour for which such through-flow with minimum losses is provided.
Fig. 13 shows an alternative detail of Fig. 10.
Figure 12:
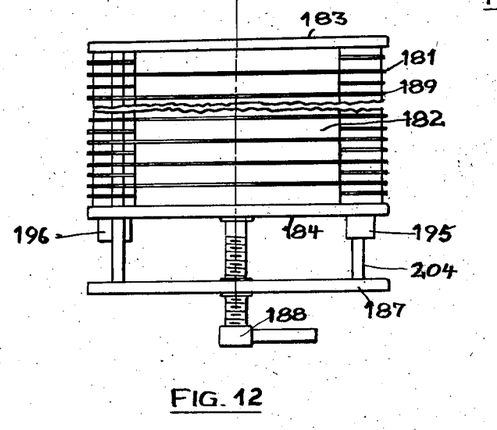

Figs. 10, 11 and 12 represent a heat exchanger providing for through-flow of one fluid taking part in the heat exchange with substantially no change of flow direction and gradual change of cross-sectional area of flow, say of a gas; the heat exchanger being used, for example, as intercooler after a compressor, with the water or other cooling medium flowing into and out of the passages in the way indicated with reference to Figs. 6 and 7.

The heat exchanger comprises an assembly of alternate heat exchanger plates 181 and 189, of which each plate 181 is flat, while each plate 189 has its top and bottom edges 185 bent over in a stream-line curve, these heat exchanger plates having interposed between them alternate spacing frames 182 and 186, the assembly being held together between end-pieces 183 and 184 on side-bars 204, and being compressed by screw 188 mounted in cross-bar 187. The spacing frame 182 has the shape shown on Fig. 10, i. e. jointing and packing 199 along the edges to form straight passages for the first fluid taking part in the heat exchange, marked by a double-headed arrow, and having two circular packings 197 and 198 arranged outside the flow of this first fluid, to form in the assembled state, ducts for the cooling water, say, across, though not through, the space of the heat exchanger passage of the first fluid. The spacing frame 186, not shown, has a packing strip passing round the edges of the plates and enclosing the entry and exit ports 193 and 194 in the heat exchanger plates, to form a heat exchanger passages for the cooling water which are interleaved with the gas passages. The ports for the water are fed from the entry and exit connection pieces 195 and 196 in the end-piece 184. The sectional side elevation Fig. 12 shows clearly that the first fluid, marked by the double-headed arrows, is divided into layers on entering the heat exchanger and flows through passages which are not crossed through by ducts for the other fluid taking part in the heat exchange. Assuming that the first fluid is the higher pressure fluid, the passages for the second fluid are provided with secondary walls 202 according to my U. S. Patent No. 2,659,392, as described in detail hereafter, which apart from serving the conduction of heat in the most efficient manner, also serve for stiffening the passages against the pressure-difference. The high pressure passages are provided with layer transposing devices 200, as already described in detail with reference to Figs. 8 and 9.

The construction will be seen to be capable of easy disassembling for cleaning or replacement of defective parts, and can also be made of different capacities by the addition or subtraction of different plates and their spacing frames, in which case the heat exchanger can still be connected to the same duct 203 since this has a broad flange 201 which connects to the end-plate 184 in the different positions corresponding to different numbers of plates and spacing frames between the end-plates.

A heat exchanger having the same effect would also be formed by equal heat exchanger plates which extend only up to the top- and bottom-edges of spacing frames 182, where the part corresponding to the bent-over portion 185 may then be formed of one piece with the spacing frames, and may be of a shape symmetrical about the centre-line of the spacing frame.

Fig. 13 shows a detail relating to heat exchanger plates of rectangular shape, in which the ports 194 and 193 are in the corners and the spacing frame then has the shape indicated in Fig. 11, whereby the flow of the first fluid (double-headed arrows) taking part in the heat exchange has to widen out after entering the heat exchanger passage.

Figure 15:
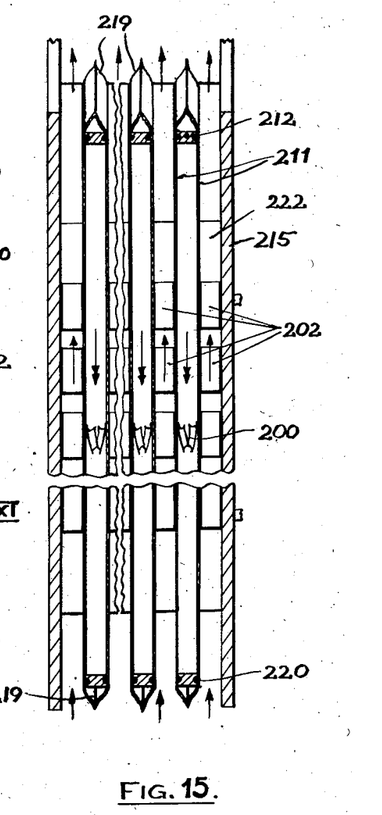
Figure 16:
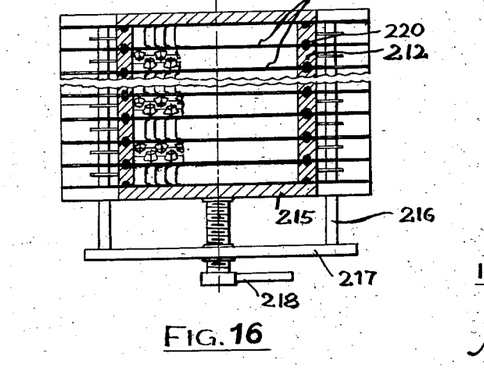

Figs. 14, 15 and 16 show a heat exchanger adapted to have through-flow for both fluids taking part in the heat exchange without sudden change in flow direction or sudden change in flow-cross-section. The assembly consists of alternate flat plates 211 of the outline shape shown partly dotted on Fig. 14. Between the plates are interposed spacing frames of the shape shown in Fig. 14, with packing strips 220 arranged as shown, which are arranged in inverse order in alternate spaces, to form interleaved heat exchanger passages for the two fluids taking part in the heat exchange, as shown, the first fluid being denoted by double-headed arrows and the second fluid by single-headed arrows. The spacing frames carry the dividing edges 219, which effect smooth in flow and out flow of fluid.

Taking the fluid denoted by double headed arrows to be the higher pressure fluid and the single headed arrows one as the lower pressure fluid, it will be seen that the passages 222 for the lower pressure fluid are provided with secondary walls 202 which, apart from their function of conducting heat between the fluid and the heat transferring walls also support the walls against the pressure-difference between the fluids.

Figure 8:
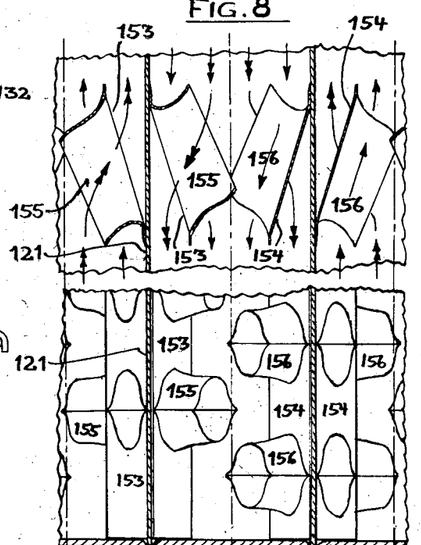
Figs. 8 and 9 show in sectional side-elevation and plan the detail of the layer transposing device in Figs. 6 and 7.
Figure 9:
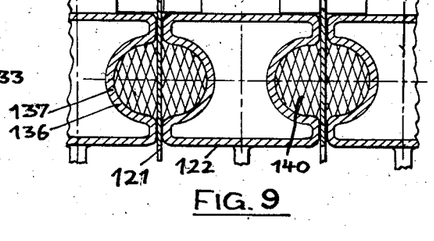

In the passages for the higher pressure fluid there are provided layers transposing devices 200 as described in detail with reference to Figs. 8 and 9.

It will be understood that in this, as in the embodiment described with reference to Figs. 10 to 13 inclusive of this specification the packing strips 220 and the like may be of any suitable material, or particularly for the case of a gas or gases taking part in the heat exchange, may be used in conjunction with packings of the labyrinth type, or such labyrinth packings may be used by themselves, where the temperature conditions make other packings inapplicable.

The heat exchanger described with reference to Figs. 19 to 21 inclusive may, for example represent a gas to gas heat exchanger as used in a gas turbine installation.

Due to the unit construction of the heat exchanger, comprising only two different parts, apart from the end-pieces, the heat exchanger may be adapted for different capacities by making it up from more or less units. The heat exchangers so formed can easily be taken to pieces for cleaning etc.

It will be understood that the parts 219 of the heat exchanger, which provide for smooth inflow and outflow of the fluids, may either be formed as parts of the plates, or as part of the spacing frame.

It will also be understood that instead of having separate spacing frames, carrying the layer transposing devices or secondary walls, these can also be formed of one piece with the respective heat transferring walls, or may be permanently fixed to such heat transferring walls.

In Figs. 10 and 11 and in Figs. 14, 15 and 16 there is indicated a spacing frame carrying secondary walls, to serve as support in low pressure passages, with or without the layer transposers described with reference to Figs. 8 and 9. Four series of secondary walls 201 are shown, with the secondary walls of the series arranged in stepwise staggered relationship such that the continuation of any secondary wall of the series does not contain any other secondary wall, and with gaps in the flow direction between the trailing edge of one secondary wall and the leading edge of the following secondary wall of the series.

This arrangement has many advantages over, say, the arrangement of closely or widely spaced secondary walls extending the entire length of the passage, viz.:

Due to the relatively short length of secondary wall, a layer is only in contact with it for as long as is required for it to take its required part in the heat exhange, instead of its temperature being changed too far, as would be the case with a whole length secondary wall with the result that the temperature difference to the fluid on the other side of the main heat transferring wall falls too far.

Further, due to the gaps between the consecutive secondary walls and the short lengths of these, the pressure increase in the fluid on meeting the leading edge and the depression on leaving the trailing edge provide a pressure difference along the secondary wall sufficient to reduce the stagnant layer which would otherwise form, particularly for liquids, and have a heat insulating effect very disadvantageous to heat transfer.

Further, due to the gaps all being at the same heights vortices formed on fluid meeting and leaving the edges, can spread all over the flow-cross-section.

A most important effect of the arrangement is that the "areas of effectiveness" of each secondary wall, as one may denote those areas on the main heat transferring wall in which the wall temperature is different from what it would be without the secondary wall and in which hence increased heat transfer takes place, do not overlap. For, with such areas overlapping, as is the case for continuous secondary walls of same length, no more heat passes through these "areas of effectiveness" than passes through a non-overlapping "area of effectiveness," as proved, so that the part of the secondary wall giving rise to such overlapping is simply wasted. Accordingly this arrangement of secondary walls with its longitudinal and lateral spacing provides an even distribution of "areas of effectiveness" of secondary walls over the whole surface of the main heat transferring walls, and thus the most economical use of secondary walls.

Altogether, this arrangement of secondary walls effects the best obtainable heat transfer with minimum area of secondary wall, which also form the most effective distribution of supports against pressure-differences between the fluids.

The shapes of secondary walls in plan, may be straight, with slightly rounded edges, or they may be altogether curved.

The secondary walls shown may be carried in the spacing frame, in which case they will be connected to one another and the frame by this strips of metal which will lie against the heat exchanger plates when the exchanger is assembled.

Alternatively, secondary walls may be permanently fixed, or formed of one piece with the heat exchanger plates themselves, as may also the spacing provision, as already described.

The secondary walls will be so made that in the disassembled state they project a little beyond the spacing frame, so that with the heat exchanger assembled they exert an elastic pressure against the plates, making the required intimate contact with them. Both layer transposing devices according to Figs. 8 and 9, and secondary walls may be provided in the same spacing frame.

It will be understood that the foregoing description has been by way of example only, and that many more constructions of heat transfer apparatus, serving either transfer of heat between the wall of a channel or duct and a fluid flowing therealong, or the exchange of heat between two fluids flowing on opposite sides of a wall, fall within the ambit of the claims appended hereto.

I claim:

1. In heat transfer apparatus comprising a conduit, an inlet for said conduit, an outlet for said conduit, a heat transferring wall extending between the said inlet and the said outlet and forming, at least in part, the said conduit; a guide-vane in said conduit between the said inlet and the said outlet, which guide-vane extends from substantially the entire width of the said heat transferring wall into said conduit and away from said inlet, and which ends remote from said heat transferring wall with an edge facing away from said inlet; a plurality of guide-nozzles set onto and leading through the said guide-vane, the said nozzles being laterally adjacent the said guide-vane and respectively beginning with an edge substantially facing towards the said inlet at a position remote from said heat transferring wall, and each said nozzle extending from the said edge away from said inlet and towards the said heat transferring wall and ending on the said guide-vane, the said nozzles being in staggered arrangement along the transverse extent of the said guide-vane; whereby when in operation with heat transfer taking place between a fluid flowing through said conduit and past the said heat transferring wall, a layer of the said fluid originally flowing adjacent said heat transferring wall is diverted by said guide-vane from said heat transferring wall at substantially the entire width thereof and is guided to flow remote from said heat transferring wall, and fluid originally flowing remote from said heat transferring wall is guided by the said nozzles to flow adjacent the said heat transferring wall.

2. A heat transfer apparatus comprising at least one duct of substantially rectangular cross-sectional shape and having an inlet and an outlet, plane heat transferring walls forming the long sides of the said cross-section of the said duct, and a flow layer transposing device in the said duct, comprising: two deflecting guide-vanes facing one another at a position between the said inlet and said outlet, which guide-vanes each extend from one of the said heat transferring walls at substantially its entire width, into the said duct and away from the said inlet, and which guide-vanes end remote from the said heat transferring walls each with an edge facing away from said inlet; and a plurality of guide-nozzles set onto and leading through the said guide-vanes, the said nozzles being laterally adjacent the said guide-vanes and respectively beginning with an edge substantially facing towards said inlet, and each said nozzle extending from said edge away from said inlet and towards a heat transferring wall, leading through the said adjacent guide-vane and ending thereon, the said nozzles being staggered along the transverse extent of each of said guide-vanes so that each nozzle faces a free section of the opposite guide-vane; whereby when in operation with heat transfer taking place between a fluid flowing through said duct and past said heat transferring walls, layers of fluid originally flowing adjacent said walls are diverted therefrom by the said guide-vanes along the entire width of the said duct and are guided to flow in the interior of said duct, and fluid flowing originally in the interior of said duct is guided by said nozzles to flow adjacent the heat transferring walls of the said duct.

3. A heat exchanger comprising a plurality of plates arranged adjacent to one another, a plurality of spacing members each interposed between a pair of said plates to form a plurality of ducts between said plates, each duct having an entry and an exit, an end-piece at each end of said heat exchanger, means for holding together under pressure on said end-pieces the said plates and the said spacing members, and means for releasing said pressure, means respectively connecting said entries and said exits of said ducts to form interleaved, but separate flow paths for at least two fluids having heat exchange with one another through the said plates, and a flow layer transposing device as claimed in claim 2 in at least one of the said ducts.

4. A heat exchanger comprising a plurality of plates arranged adjacent to one another, a plurality of spacing frames each interposed between two of said plates, packing in said frames, said packing contacting at least the marginal edges of said plates, an end-piece at each end of said heat exchanger, means for holding together under pressure on said end-pieces the said plates and spacing frames, and for releasing the said pressure, four holes in each of the said plates, said holes being opposite one another for adjacent plates, two holes in each of the said end-pieces opposite two of said holes in said plates, packing provision in each of said spacing frames respectively surrounding each of two holes in said plates and contacting said plates to separate these holes from the rest of the space enclosed between the said two plates and the said spacing frame, the said packing surrounding an alternate pair of holes in alternate spaces between plates and thereby forming two sets of ducts through said spaces, which ducts are interleaved, but separate from one another, for at least two fluids to flow therethrough and to have heat exchange with one another through the said plates; and a flow layer transposing device in at least the said ducts for one of the said fluids, the said flow layer transposing device comprising: two deflecting guide vanes facing one another at a position between the said holes forming respectively the inlet and the outlet for fluid in a duct, which guide-vanes each extend from one of the said heat transferring plates at substantially its entire width, into the said duct and away from the said inlet, and which guide-vanes end remote from the said heat transferring plates each with an edge facing away from the said inlet; and a plurality of guide-nozzles set onto and leading through the said guide-vanes, the said nozzles being laterally adjacent the said guide-vanes and respectively beginning with an edge substantially facing towards said inlet, and each said nozzle extending from said edge away from said inlet and towards a heat transferring plate, leading through the said adjacent guide-vane and ending thereon, the said nozzles being staggered along the transverse extent of the said guide-vanes so that each nozzle faces a free section of the opposite guide-vanes; whereby when in operation with heat transfer taking place between a fluid flowing through the said duct and past said heat transferring plates, layers of fluid originally flowing adjacent said plates are diverted therefrom by the said guide-vanes along the entire width of the said duct and are guided to flow in the interior of the said duct, and fluid flowing originally in the interior of said duct is guided by said nozzles to flow adjacent the heat transferring walls of the said duct.

5. A heat exchanger comprising a plurality of plates arranged adjacent to one another, a plurality of first spacing frames and a plurality of second spacing frames, respectively interposed between each second pair of said plates, an end-piece at each end of the said heat-exchanger, means for holding together under pressure on said end-pieces the said plates and the said spacing frames, each of the said plates having two holes remote from one another and the said end-pieces having each one hole opposite one of the said holes in the said plates; the said first spacing frames comprising a packing, the said packing contacting the marginal edges of the said plates, and the said second spacing frames each comprising a packing contacting only two opposite marginal edges of the said plates, and packing surrounding the said two holes in the said plates, which arrangement forms two sets of interleaved ducts between the said plates, where in the ducts formed by said first spacing frames fluid originally having entered the hole in one of the end-pieces enters through one of the holes in the plates, flows along the length of said plates, leaves through the said second hole and finally through the hole in the said other end-piece, and where in the alternate ducts formed by the said second spacing frames a second fluid flows along a path defined by the packing at opposite edges of the said plates and said packing round the said holes, said second fluid respectively entering and leaving the said ducts at the edges of the plates not covered by packing, thus forming entries and exits, and said heat exchanger comprising a flow layer transposing device in at least said ducts for one of the said fluids, and fixed in the said spacing frame for said ducts, the said layer transposing device comprising: two deflecting guide vanes facing one another at a position between the said entry and exit of a duct, which guide vanes each extend from one of said heat transferring plates at substantially its entire width, into the said duct and away from the said inlet, and which guide-vanes end remote from the said heat transferring plates each with an edge facing away from the said inlet; and a plurality of guide-nozzles set onto and leading through the said guide-vanes, the said nozzles being laterally adjacent the said guide-vanes and respectively beginning with an edge substantially facing towards the said inlet, and each said nozzle extending from said edge away from the said inlet and towards a heat transferring plate, leading through the said adjacent guide-vane and ending thereon, the said nozzles being staggered along the transverse extent of the said guide-vanes so that each nozzle faces a free section of the opposite guide-vanes; whereby when in operation with heat transfer taking place between a fluid flowing through the said duct and past the said heat transferring plates, layers of fluid originally flowing adjacent said plates are diverted therefrom by the said guide-vanes along the entire width of the said duct and are guided to flow in the interior of the said duct, and fluid flowing originally in the interior of the said duct is guided by the said nozzles to flow adjacent the heat transferring walls of the said duct.

6. A heat exchanger comprising a plurality of plates of substantially hexagonal shape having two opposite edges elongated, a plurality of first spacing frames and plurality of second spacing frames respectively interposed between each second pair of the said plates, and end-cover adjacent the plates at each end of said heat exchanger, means for holding together under pressure on said end-covers the said plates and the said spacing frames, and for releasing the said pressure, said first spacing frames comprising packing contacting the said elongated edges of the said plates and two opposite shorter edges, the said arrangement forming two sets of ducts interleaved with one another, but separate from one another, in which each respectively flows a fluid along a path defined by the said plates and said packing along the edges thereof, the said fluids respectively entering and leaving the said ducts at the edges of the plates not covered by packing, these edges forming respectively an entry and an exit for the respective duct, and the said heat exchanger further comprising a flow layer transposing device in at least the ducts of one of the said sets and fixed in the said spacing frames of the said ducts, the said layer transposing device comprising: two deflecting guide-vanes facing one another at a position between the entry and the exit of the said duct, which guide-vanes each extend from one of the said heat transferring plates a substantially the entire width thereof, into the said duct and away from the said entry, and which guide-vanes end remote from the said heat transferring plates each with an edge facing away from the said inlet; and a plurality of guide-nozzles set onto and leading through the said guide-vanes, the said nozzles being laterally adjacent the said guide-vanes and respectively beginning with an edge substantially facing towards said inlet and each guide-nozzle extending from said edge away from the said inlet and towards a heat transferring plate, leading through the said adjacent guide-vane and ending thereon, the said guide nozzles being staggered along the transverse extent of the said guide-vanes so that each nozzle faces a free section of the opposite guide-vane; whereby when in operation with heat transfer taking place between a fluid flowing through the said duct and past the said heat transferring plates, layers of fluid originally flowing adjacent the said plates are diverted therefrom by the said guide vanes along the entire width of the said duct and are guided to flow in the interior of the said duct, and fluid flowing originally in the interior of the said duct is guided by the said nozzle to flow adjacent the heat transferring plates of the said duct.

7. In heat transfer apparatus comprising at least one heat exchanger tube having an inlet and an outlet, a guide-vane in the said tube between the said inlet and the said outlet, which guide-vane extends from substantially the entire periphery of the said tube-wall into the said tube and away from the said inlet, forming a substantially frusto-conical deflecting vane pointing away from the said inlet and ending with an edge facing away from the said inlet; a plurality of guide-nozzles internally set on the said frusto-conical deflecting vane, the said guide-nozzles starting with an opening substantailly directed towards the said inlet and respectively leading through the said frusto-conical deflecting guide-vane and ending thereon; the said nozzles being in staggered arrangement along the transverse extent of the said deflecting guide-vane so that each nozzle has opposite it a free section of the said deflecting guide-vane; whereby when in operation with heat exchange taking place between a fluid flowing through the said tube and a second medium outside the said tube, a layer of the said fluid flowing originally adjacent the said wall of said tube is diverted therefrom at substantially the entire periphery of the flow cross-section and is guided to flow in the interior of the said tube, while fluid flowing originally in the interior of the said tube is guided by the said nozzles to flow adjacent the wall of the said tube.

References Cited in the file of this patent

UNITED STATES PATENTS

| | | |
|---|---|---|
| 646,378 | Szamatolski | Mar. 27, 1900 |
| 911,829 | Mauvernay | Feb. 9, 1909 |
| 1,015,831 | Pielock et al. | Jan. 30, 1912 |
| 1,399,236 | Yamashita | Dec. 6, 1921 |
| 1,849,874 | Huet | Mar. 15, 1932 |
| 2,196,707 | Nelson et al. | Apr. 9, 1940 |
| 2,239,685 | Noack | Apr. 29, 1941 |
| 2,281,754 | Dalzell | May 5, 1942 |
| 2,361,691 | Jendrassik | Oct. 31, 1944 |
| 2,488,615 | Arnold | Nov. 22, 1949 |

FOREIGN PATENTS

| | | |
|---|---|---|
| 57,298 | Austria | July 1, 1912 |
| 345,279 | Great Britain | Mar. 17, 1931 |
| 634,751 | Great Britain | Mar. 29, 1950 |